United States Patent Office 3,114,419
Patented Dec. 17, 1963

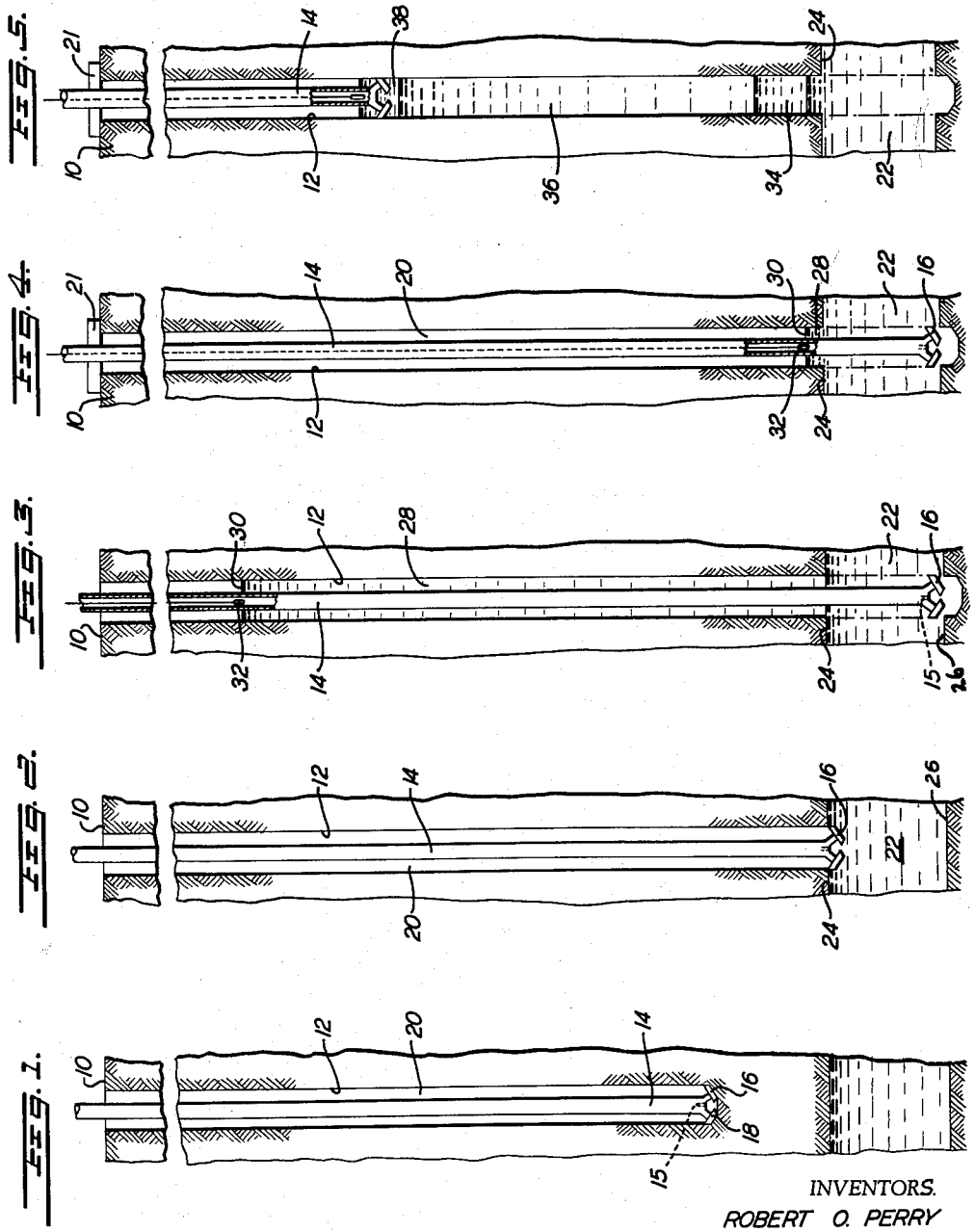

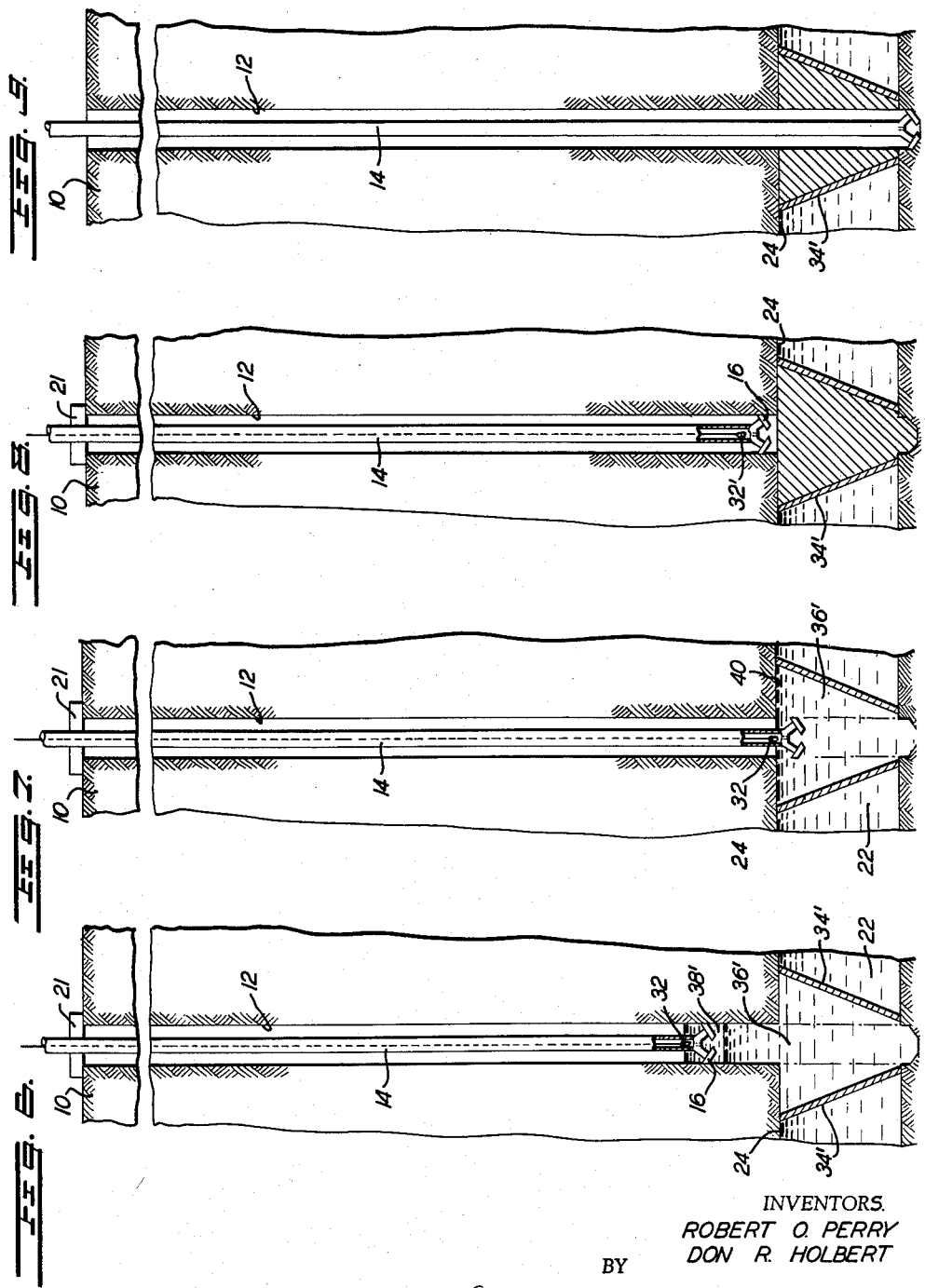

3,114,419
METHOD FOR POLYMERIZING LIQUID RESIN-FORMING MATERIALS
Robert O. Perry and Don R. Holbert, Tulsa, Okla., assignors, by mesne assignments, to Sinclair Research, Inc., New York, N.Y., a corporation of Delaware
Filed June 12, 1958, Ser. No. 741,550
8 Claims. (Cl. 166—33)

This invention relates to a method for polymerizing liquid resin-forming materials suitable for use in well bores penetrating permeable subterranean formations. More particularly the present invention is concerned with a method employing radiation to copolymerize an alkylidene bisacrylamide and an ethylenic monomer.

These resin-forming materials have particular utility in the well treating field, e.g. processes which combat the obstruction of gas circulation when gas-drilling wells through permeable subsurface formations and other processes which partially or completely plug permeable subterranean well areas. Presently, chemical polymerization catalysts, e.g. ammonium persulfate, are added to the liquid resin-forming material near the well site prior to placing the material at the desired location within the well bore. This procedure renders control difficult during the crucial moments of polymerization since sometimes the polymerization of the resin-forming material, causing a change from a mobile liquid to a solid mass, is entirely too rapid to enable an operator to place the liquid in the desired location in the well bore. On the other hand, polymerization of the material is sometimes too slow such that any existing turbulence in the well bore will move the material out of position and thus critically curtail its sealing effect. Moreover, the use of a chemical catalyst per se has some serious drawbacks. The presence of gases or certain ions in the water (e.g. $Fe^{2+}$) completely disrupts the reproducibility of gel times. Furthermore, it is impossible to make any change in the gel time by chemical means after the solution has been injected into the formation. This means that once the solution is prepared and in the formation, the gel time is fixed and cannot be shortened for the sake of expediency nor lengthened in the event of mechanical difficulties.

The present invention is directed to a method providing good control of the copolymerization time or set time of an alkylidene bisacrylamide and an ethylenic monomer, particularly when this material is copolymerized in a well bore hole penetrating a permeable subterranean formation. The desired result is accomplished by subjecting an aqueous mixture of the alkylidene bisacrylamide and the ethylenic monomer to a physical method of initiating polymerization, i.e. radioactive source material which gives off, for example, gamma rays, with an intensity sufficient to copolymerize these compounds expeditiously.

Radioactive source material must meet several requirements, especially when used in the field. For example, it must have a radiation energy level or activity sufficient to cause polymerization of the resin-forming material in an expeditious manner while being safe for use by personnel in the field. The intensity of radiation or activity of the source material is preferably as high as can be handled with safety.

As other examples of desirable requirements for such source materials, the presence of the source material should not alter the character of the metal it comes in contact with and the source material should not leave a residual radioactivity sufficient to endanger operating personnel or to contaminate to a dangerous extent the material, such as (when irradiation takes place in a well bore) oil, which is subsequently passed in contact with the area irradiated in the well bore, after the source material is itself withdrawn. Another desirable requirement is that the source material should be capable of being shaped so as to permit maximum effective irradiation of the liquid resin-forming material consonant with the requirements of safety, time and the like. In addition, it should be capable of being situated so as to produce effective radioactive contact with the resin-forming liquid material. Preferably the source material is positioned within or adjacent to the resin-forming liquid. Suitable source materials e.g. gamma ray source materials, and, preferably with a long half-life, are $cobalt^{60}$, $zinc^{65}$, $cesium^{137}$, $tantalum^{182}$, $iridium^{192}$, used nuclear reactor fuel elements and mixed fission products.

With respect to oil well casings, it has been found that $cobalt^{60}$ meets the previously set forth requirements for a source material and can be readily obtained at radiation intensities suitable for the treatment of the accessible surface of the resin-forming liquid material and up to about a foot beyond such surfaces into the surrounding terrain. Its use in such treatments neither affects the character of the steel casings nor, if it is placed in properly contained form, leaves residual radioactivity dangerous to operating personnel. Moreover, it can be placed in such a form as to give maximum radioactive contact with the accessible surface of the resin-forming material requiring irradiation. $Cobalt^{60}$ is preferred, because of its particular adaptability for use in oil well casings.

The liquid resin-forming materials employed in the method of the present invention and particularly suitable for use in the well bore treating field include an aqueous solution of an alkylidene bisacrylamide and an ethylenic comonomer, the former having the formula:

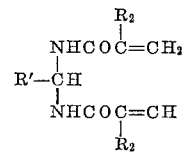

in which $$R'-\overset{|}{\underset{|}{C}}H$$

is a hydrocarbon residue of an aldehyde containing for instance from about 1 to 10 and preferably from about 1 to 5 carbon atoms, e.g. formalde-, acetalde-, and valeraldehyde, but usually about 1 to 3 carbon atoms; and $R_2$ is a member of the group consisting of hydrogen and a methyl radical.

The other comonomer is a solid, liquid or gaseous ethylenic (i.e., contains at least the $>C=C<$ radical) compounds with a solubility of at least about 2% by weight, and preferably at least about 5%, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, and which is capable of polymerizing.

In addition to the comonomer N,N'-methylene bisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having a formula containing at least one >C==C< group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals

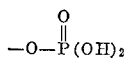

—OOCH, —OOCCH$_3$; —SO$_3$X, where X is H, NH$_4$, an alkali metal or an alkylamine; —CONR$_2$ and

where each R is hydrogen, alkylol, lower alkyl or a polyoxyalkylene radical; and —COOR' and —CH$_2$COOR', where R' is an H, NH$_4$, an alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate and methacrylamide but acrylamide is optimum. Other suitable ethenoid compounds are acrylic acid; other N-substituted acrylamides, such as N-methyl acrylamide, N-3-hydroxypropylacrylamide, dimethylamino-propylacrylamide, N-ethylol acrylamide; acrylonitrile; saturated alkyl esters of acrylic acid, i.e., methyl acrylate, β-hydroxyethyl acrylate; ethylene glycol and polyethylene glycol acrylates, an example being the reaction product of β-hydroxyethyl acrylate or acrylic acid with about 1 to about 50 mols or more of ethylene oxide; salts of acrylic acid, i.e., magnesium acrylate, sodium acrylate, ammonium acrylate, zinc acrylate, β-aminoethyl acrylate, β-methyl aminoethyl acrylate, guanidine acrylate and other organic nitrogenous base salts, such as diethylamine acrylate and ethanolamine acrylate; quaternary salts like alkyl acrylamidopropyl dimethylamino chlorides; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof can also be used. Derivatives of this kind and other suitable compounds include α, β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succinidiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di-(methylaminoethyl) maleate, di(N,N-dimethyl β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds.

The preferred resin-forming material which can be utilized in the method of the present invention is in an aqueous medium and has an initial viscosity up to about 15 centipoises but usually an initial viscosity approximating that of water. This material can be formed by dissolving a mixture of acrylamide and N,N'-methylenebisacylamide in fresh water. Generally, this mixture contains about 1 to 25 weight percent, of N,N'-methylenebisacrylamide and about 99 to 75 weight percent of acrylamide. The aqueous solution will usually include from about 5 weight percent of this mixture to its limit of solubility and preferably this amount is about 5 to 25 percent. Although the acrylamide as such is preferred, its nitrogen atom could be substituted as with a hydroxy methyl or a hydroxy ethyl group. A specific resin-forming material found useful is an aqueous solution which contains 20 weight percent of resin-forming material (95 weight percent of acrylamide, 5 weight percent of N,N'-methylenebisacrylamide) and the balance being water.

When using the resin-forming composition in a well plugging process, unless the material is light enough to remain upon the surface of the salt water which has a specific gravity greater than 1, generally at least about 1.2, it must be quickly displaced into the permeable area before it can disperse into the salt water phase or an overlying fresh water layer, if any be present. To reduce the chances of this happening, resin-forming materials having specific gravities of up to about 1.18, preferably up to about 1.13, can be used. Also, as it is most advantageous to locate the resin-forming material between the salt water layer and an overlying fresh water column, the resin-forming material preferably has a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. sugar and glycerol. The mixture is not particularly catalyzed by contact with iron, brass or copper when small amounts of ammonium persulfate and sodium thiosulfate or nitrilotrispropionamide are present. It has an initial viscosity (1.3 centipoises) approximating that of water (which is about 0.5 to 1.5 centipoises under the conditions in many well bores) and is not greater than about 2.0 centipoises over its working life to facilitate its placement in the desired well area. The specific gravity of the mixture is about 1.12.

In our method, an alkylidene bisacrylamide and an ethylenic monomer are copolymerized to a gel structure in an aqueous solution using a radioactive source material in, for instance, the gamma-ray region with an intensity sufficient to polymerize the resin-forming material which can be generally polymerized when subjected to a gamma radiation dosage of from about .05 to 150 kiloreps. A kilorep is the energy absorption per unit weight of resin-forming material and is equivalent to 93,000 ergs per gram. The time for effecting gel formation is dependent on total dosage received, but not on dosage rates when in the range from 20 to 500 kiloreps per hour.

In one embodiment of our method, particularly suitable when polymerization is effected in a well bore, a small amount of catalyst, e.g. ammonium persulfate, is added to an aqueous mixture of the alkylidene bisacrylamide and ethylenic monomer prior to irradiation. This procedure significantly reduces the set time normally required if only chemical catalysts were used and in addition significantly reduces the radiation dosage normally necessary to effect polymerization by radiation alone. The ammonium persulfate is an acceptable catalyst to polymerize this aqueous mixture and it can be empolyed with a promoter such as sodium thiosulfate or nitrilotrispropionamide. The amounts of each of the catalysts and promoter usually are about 0.1 to 2.0 weight percent but preferably about 0.3 to 0.6 weight percent based on the aqueous solution of the resin-forming material while the radiation dosage will generally be from about 15 to 75 kiloreps and preferably from about 25 to 40 kiloreps. These amounts can be varied, according to the radiation dosage employed, to give the working life of the resin-forming material. For instance, when a radiation dosage of 1 kilorep is contemplated, about 0.3 weight percent of ammonium persulfate and 0.6 weight percent of nitrilotrispropionamide can be incorporated in a resin-forming material such that after placement in position in the well bore, this radiation dosage will effect polymerization in about 20 minutes to 8 hours and usually in about 20 minutes to 2 hours.

In a second and highly preferred embodiment of the present invention, an uncatalyzed aqueous solution of resin-forming material, e.g. alkylidene and bisacrylamide and ethylenic monomers, is purged with an inert or non-free oxygen-containing gas, e.g. nitrogen, carbon dioxide, or natural gas, and is subjected to radiation. It is believed that oxygen present in the solution curtails the polymerization effect produced by radiation. Thus, the solution is purged with inert gas to reduce the oxygen content thereof generally to less than about 1 p.p.m. (parts per million) and preferably to reduce the oxygen content within the range of about 0.0 to 0.7 p.p.m. The radiation dosage generally employed is from about 0.05 to 5 kiloreps and preferably from about 0.1 to 1.5 kiloreps. The significance of this highly preferred embodiment lay in the enormous reduction of the radiation dosage normally required to effect polymerization of the resin-forming material.

In a third embodiment of the present invention, a small amount of catalyst, e.g. ammonium persulfate, is added to an aqueous mixture of the alkylidene bisacrylamide and ethylenic monomer, the mixture is purged with an inert gas of the type described above, and is subjected to gamma radiation. The mixture can be purged with the inert gas prior to the catalyst addition.

The present invention can be incorporated in a method employed in plugging a permeable well location, for instance, in a method described in copending application Serial No. 642,867, filed February 27, 1957, now Patent No. 3,044,548, hereby incorporated by reference. In this method the area to be plugged must first be located as to its vertical position in the well bore. This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well, or fresh water can be injected which after remaining a sufficient period in the bore will become salty due to the presence of salt in the earth's strata. After the proper level of salt water is established an organic resin-forming material is positioned on this medium. Preferably, the salt water layer is below a fresh water layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure and allowed to remain in the area to set up or harden to provide a partial or complete plug resistant to the flow of fluids, particularly liquids. The permeable area to be plugged can be located by conventional procedures e.g. the use of liquid-to-liquid interfaces between two dissimilar liquids such as water and oil, fresh and salt water, and radioactive and non-radioactive liquids e.g. see U.S. Patent Nos. 2,376,878 and 2,413,435 and Pfister, R. J. Trans. A.I.M.E., vol. 174, page 269, 1948, to determine the injectivity profile or liquid injection characteristics of the well or sand face.

By following the present invention, after the resin-forming material is displaced into the adjacent well area, a radioactive source is lowered into the well bore, the resin-forming material, in this instance an aqueous solution of alkylidene bisacrylamide and an ethylenic monomer described above, is irradiated and polymerization is effected. The radioactive source is removed leaving the polymerized material as a rigid solid and thus sealing the permeable formation.

The present invention can also be incorporated in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium. A method of this type is described in copending application Serial No. 686,198, filed September 25, 1957, now Patent No. 3,011,547, hereby incorporated by reference.

As described in this application, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, resin-forming material is introduced into the well bore. This material is of the type that will harden at temperatures encountered in the well bore, which in many cases are between about 50 to 80° F. The quantity of resin-forming material used must be adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is imperative that the resin-forming material occupy the well bore adjacent the formation of ingress when the hardened resin is formed. Accordingly, after the introduction of the resin-forming material into the well bore, detection means are employed to track the upper level of the resin-forming material, gas or liquid e.g. air or water pressure, is applied to bring this upper level approximately adjacent the upper level of the strata of ingress, and the resinous material is maintained in this position until it solidifies. Although air, other gas or liquid pressure can be employed in our method, air is preferable since (a) it permits better control of the plastic material, (b) the position of the resin-forming material is determined with facility as a result of the sharp difference in electrode readings (milliamps) between plastic and air and (c) the well bore hole is dry following the polymerization of the resin-forming materials. The gas pressure will depend upon the nature of the obstruction encountered and the depth of the permeable formation but is generally greater than about 150 p.s.i. but is usually about 150 to 1000 p.s.i. Since tremendous pressures can be required, it may be desirable to produce such pressures by employing liquid and gas in combination, e.g. provide a liquid column above the resin-forming material and exert air pressure on the liquid column. Following solidification of the resinous material, air-drilling is resumed.

In the practice of this method, it may be desirable to place a small volume of liquid or primary buffer before the resin-forming material to prevent contact of the resinous material with the materials in the lower portion of the well bore, e.g. salt water. This primary buffer should have a density in between that of the well bore fluid and the resinous material so that the buffer will have a tendency to float or remain between the well fluid and resinous material. Examples of suitable buffers are mixtures of 60% by volume of kerosene and 40% by volume of carbon tetrachloride with a specific gravity of 1.13 or mixtures of 82% by volume of kerosene and 18% by volume of tetrabromoethylene.

It may also be desirable to place on the resin-forming material a volume of liquid or secondary buffer possessing a degree of electrical conductivity appreciably different from that of the resin-forming material to facilitate tracking of the resin-forming material; the density of the secondary buffer should be less than that of the resinous material and preferably greater than that of any fluid, liquid, or gas, used to pressure the resinous material to its position of hardening. Suitable secondary buffers are 2% by weight of calcium chloride in water with specific gravity of 1.015 and 4% ammonium chloride in water solution with specific gravity of 1.01. When the resin-forming material is appreciably electrically conductive, the secondary buffer can be essentially non-conductive.

The detection means employed for tracking the position of the resin-forming material in the well bore can vary. In one method, a soluble radioactive tracer may be injected into the polymerizable material and a Geiger counter attached to a line can be employed to locate the polymerizable material and thus by checking the depth of the Geiger counter, the position of the polymerizable material is known. In another method, the characteristics of the material can be such that it is detectable by an electrical conductivity profiling unit when the secondary buffer is placed on the resin-forming material. Thus if the secondary buffer is essentially conductive and the resin-forming material is essentially non-conductive the conductivity profiling unit will indicate the degrees of current flow within the resin-forming material and secondary buffer. Accordingly, when the conductivity circuit is essentially good, the instrument is in the secondary buffer and when the conductivity circuit is essentially poor, the instrument is in the resin-forming material. Thus by raising and lowering the instrument the interface in between the resin-forming material and the secondary buffer can be located and by checking the depth of the detection instrument the location of the upper layer of the resin-forming material is known. Conversely, the secondary buffer may be essentially non-conductive and the resin-forming material may be essentially conductive such that an essentially good conductivity circuit indicates the presence of the instrument in the resin-forming material while an essentially poor conductivity circuit indicates presence of the instrument in the secondary buffer.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core, and fixedly mounted within a structure. The other combination, conveniently referred to as the stinger comprises a cable containing an insulated electrical conductor communicating with the other coil which is contained within a structure adapted to removably surround the first coil. Under operational conditions the magnetic coupler sub may be installed in a position just above the drill bit in a rotary type drill string. Accordingly, when the position of a liquid of known electrical conductivity within the well bore is desired, the stinger is lowered into the drill pipe string and joined to the magnetic coupler sub, the drill pipe is maneuvered until the liquid or the interface between liquids is located, and by noting the depth of the stinger, the position of the liquid or the interface between two liquids is known. Additionally, if a two-conductor cable is employed in the stinger arrangement the stinger itself can be used as an integral detection unit.

The present invention can be incorporated in this gas drilling method after the resin-forming material is in place. At this point, radioactive source material, e.g. a cobalt$^{60}$ pipe or other suitable radioactive source, is placed on the drill bit and lowered into the well bore hole inside the drill pipe to effect polymerization of the material.

The following specific examples will serve to illustrate our invention but are not to be considered limiting.

*Example I*

A 100 ml. portion of (AM–9) an aqueous solution including 10 weight percent of resin-forming material (95 percent acrylamide and 5 percent N,N'-methylenebisacrylamide) and the balance water is placed in a radiation cave. The solution is polymerized to a gel after receiving a gamma radiation dosage of 50 kiloreps per hour for two hours. The source of gamma radiation is used nuclear reactor fuel elements procured from the U.S. Atomic Energy Commission.

*Example II*

A 100 ml. portion of an aqueous solution including 10 weight percent of resin-forming material (95 percent acrylamide and 5 percent N,N'-methylenebisacrylamide), 0.06 weight percent ammonium persulfate, 0.12 weight percent nitrilotrispropionamide, and the balance water is placed in a radiation cave. The solution is polymerized to a gel after being subjected to a gamma radiation dosage of 50 kiloreps per hour for 36 minutes. The source of gamma radiation is used nuclear reactor fuel elements procured from the U.S. Atomic Energy Commission.

*Example III*

Five samples (100 ml. portions) Nos. 62 to 65, and 67, of an aqueous solution including 10 weight percent of resin-forming material (95 percent acrylamide and 5 percent N,N'-methylenebisacrylamide) and 90 weight percent water were prepared for polymerization by gamma radiation in a radiation cave. The source of gamma radiation is used nuclear fuel elements procured from the U.S. Atomic Energy Commission.

The samples, except No. 65, were prepared by purging with nitrogen. After several volumes of nitrogen had bubbled through a sample, it was sealed and subjected to gamma irradiation at 50 kiloreps per hour in a manner similar to those employed above in Examples I and II. The amount of irradiation necessary to produce gelation had dropped from 100 kiloreps down to less than one kilorep. No chemicals were added so this reduction was due entirely to the absence fo dissolved oxygen. Tests were then run in an attempt to learn just how much dissolved oxygen would produce inhibition effect. The results are tabulated below:

| Sample No. | Dissolved Oxygen (in p.p.m.) | Dosage (in Kiloreps) |
| --- | --- | --- |
| 62 | 0.00 | 0.37 |
| 63 | 0.40 | 0.39 |
| 64 | 0.64 | 0.42 |
| 67 | 0.88 | 5.00 |
| 65 | 9.20 | 100 |

The Winkler method was used in the oxygen determination. An atmosphere of nitrogen was maintained during titration to minimize errors due to absorption. Sample No. 62 was given special treatment in addition to purging. After it was purged, the solution was placed in a tube equipped with a stopcock and the tube was attached to a vacuum pump line. By alternately freezing and melting the sample while under vacuum, thorough degasification was attained. It was then subjected to irradiation in the same manner as the rest of the samples. The dosage requirement was 0.37 kilorep. Simply purging a solution with nitrogen usually reduces the oxygen content from its air saturated value of about 9.2 p.p.m. down to about 0.50 p.p.m. The dosage requirement for polymerization is usually from about 0.3 to 0.5 kilorep in this zone.

*Example IV*

In order to roughly check the penetrative character of the gamma rays, a test was designed to approximate downhole conditions. A five gallon bucket was filled up to within three inches of the top. The bucket was then filled with a solution of AM-9. The top three inches consisted merely of the solution, while the rest of the bucket then consisted of sand saturated with solution. The bucket was then placed in a position directly under the irradiating elements so as to be exposed to radiation only from the top. After exposing for a period of 30 minutes at 50 kiloreps per hour to cause gelation in the body of the sand, the exposure was discontinued and the specimen examined.

The top three inches had gelled stiffly. The next three inches consisted of a tough impermeable layer of sand stuck together by a matrix of gelled AM-9. It had considerable mechanical strength and was broken with the hands only with application of considerable force. Below four inches into the sand little of the solution had gelled. This indicates that the degree of penetration will depend in each case on the dose (or in other words, the length and intensity of exposure).

*Example V*

The following example illustrates a method, using the resin-forming materials and the polymerization technique described above, for combatting the obstruction of gas circulation when gas-drilling wells through permeable subsurface formations.

The example can best be described with reference to the drawing, FIGURES 1 through 9, in which several distinct phases of the method are illustrated.

Referring to the drawing, FIGURE 1, the numeral 10 represents the earth's surface through which a well bore 12 is being drilled to an oil-producing formation with rotary drilling pipe 14 containing a rotary bit 16 at the lower end. Pressurized air is introduced into drill pipe 14 at the surface of the earth, is conducted downwardly therein, exists through opening 15 of rotary drill bit 16 at the site or formation of drilling 18, and passes upwardly through annulus 20, surrounding drill pipe 14, carrying relatively small as well as larger rock particles from the site of drilling to the earth's surface.

In FIGURE 2 rotary drill bit 16 penetrates a salt water formation 22 at its upper level 24 as indicated by a reduction in air circulation as well as the muddy nature of the particles recovered from the site of drilling. The depth of the drill bit is noted and thus the position of upper level 24 of salt water formation 22 is known. In FIGURE 3 drilling is continued through the salt water-bearing formation, air circulation eventually ceases due to the back pressure of the salt water, a column of salt water 28 rises in the well bore to level 30, a detecting device 32 is inserted to locate the upper level 30 of the column of salt water. The lower level 26 of the salt water formation 22 is penetrated by rotary drill bit 16 and drilling is discontinued.

In FIGURE 4 annulus 20 is sealed at the surface with casing head 21, and a bogey run (not shown) is conducted to determine the position of lower level 26 and includes pumping 20 gallons of a sugar-water solution weighted to float on the salt water column and thus create an interface with the salt water column. Pressure is applied to the sugar-water-salt water column to move the column downwardly in the well bore and the stinger is used to simultaneously track the interface. As the column moves downwardly, the salt water is continuously forced into the permeable formation except for the lowermost portion of the salt water column which extends from the lowermost extremity of the well bore upwardly to lower level 26. This lowermost portion is substantially immobile and exerts back pressure at level 26. As a result of this back pressure, the interface will stop moving downwardly at lower level 26 and thus, by noting the depth of the tracking stinger at this point, the position of lower level 26 is known. When other than salt water permeable formations are encountered, it may be necessary to provide salt water to form a column when utilizing this procedure to determine the lower level of the permeable formation.

Pressurized air is introduced at the surface into drill pipe 14 to bring the upper level 30 of water column 28 approximately even with upper level 24 of salt water formation 22. The position of upper level 30 of the water column is located and tracked during this operation with detecting device 32.

In FIGURE 5, the drill pipe and bit are lifted to a position just above the upper level 24 of salt water formation 22, 10 gallons of primary buffer, which is a non-conductor fluid and intermediate in density between the salt water well bore fluid and the plastic, comprising a mixture of 82 percent by volume of kerosene and 18 percent by volume of tetrabromoethylene is injected into drill pipe 14 and is shown at position 34. Fifty gallons of resinous material purged by the bubbling of 66 cubic feet of nitrogen over a 10-minute period therethrough and consisting essentially of 20 weight percent of a mixture of 5 percent N,N'-methylenebisacrylamide and 95 percent acrylamide in water is injected down drill pipe 14 at a rate of 2 gallons per minute and positioned in area 36 located above buffer containing area 34. Four gallons of secondary buffer, which is a conducting solution comprising 2 percent by weight calcium chloride in water with specific gravity of 1.01 and of a density less than that of the resin-forming material, is injected down drill pipe 14 and is positioned in area 38 located above resin-containing area 36. Following each of the steps of introducing the primary buffer, the resinous material, and secondary buffer, it is necessary to lift the drill pipe above the level of the material present in the well bore to insure placement of the incoming material on top of the previously introduced material.

In FIGURE 6, detecting device 32 is lowered into secondary buffer 38', pressurized air (250 p.s.i.) is introduced downwardly in drill pipe 14 and commences to force a displacement of resinous material 36' thus causing the resinous material to extend into the formation behind primary buffer 34'. In FIGURE 7, the displacement of resinous material by the air is discontinued when the upper level 40 of the resinous material 36' is approximately even with the upper level 24 of the salt water-bearing formation 22 as measured by raising and lowering cell 32 through the resin upper buffer interface. The resinous material is maintained in this position by regulating the air pressure at the surface. To track the secondary buffer, thus the upper level of the resinous material, it may be necessary to lower the drill pipe into the solution of resinous material as illustrated in the drawing. Tracking device 32 is removed and cobalt[60] (a 1000 curie gamma ray source material) device 32' is lowered (not shown) to the lowermost level of and is moved upwardly through the resin-forming material which is 13 feet in depth and receives a gamma ray dosage of 1 kilorep. The resinous material is copolymerized to a semi-solid gel in about 30 minutes. The mixture of the resinous ingredients employed in this example are particularly desirable since they will not prepolymerize upon contact with iron, brass or copper. Following the solidification of the resinous material, as shown in FIGURE 8, air pressure is discontinued, cobalt[60] device 32' is removed, the drill pipe is raised above the resinous material and air circulation down drill pipe 14 to rotary drill bit as well as drilling are resumed, the solidified resinous material is drilled-through, and the drilling continues downwardly into the earth's surface as exemplified in FIGURE 9 while removing cuttings from the well bore by air circulation down the drill pipe and up the well annulus.

*Example VI*

The following example illustrates a method, using the liquid resin-forming materials and polymerization technique described above, to plug a permeable subterranean well area.

A specific example of our method can be illustrated by reference to a field operation which is not to be considered limiting either procedurally or with respect to the composition of the resin-forming material. In this operation the well is a water flood injection well having a 1½" diameter cement tubing and a shot bore hole. Three days are spent cleaning out the well by pumping water in and out of the bore hole using a ½" pipe wash string. An injection profile is obtained by the constant interface method using fresh and salt water and the well is found to be fractured at about 814½' from ground level. The total injection rate of the well is about one gallon per minute of fresh water at a well head pressure of 230 p.s.i.g. Five gallons of untriggered resin-forming material, composed of:

| | Percent |
|---|---|
| Acrylamide | 19 |
| N,N'-methylenebisacrylamide | 1 |
| Water | Balance | and the material had the following properties at about 75° F.

| | Percent |
|---|---|
| Viscosity _____centipoises__ | 1.3 |
| Specific gravity | 1.12 | are passed down a ½" tubing which contained a conductivity profiling unit, see application Serial No. 618,583 to Stefan E. Szasz, filed October 26, 1956. The resin-forming material passes by the unit and emerges from the pipe or tubing piece extending from its lower end positioned at the interface between a lower layer of salt water and an overlying layer of fresh water which is formed at about 814½' down the well. The resin-forming material is displaced down the ½" tubing at the rate of about one gallon per minute and while this is being done fresh water was bled at the well head from the annulus between the ½" tubing and the 1½" cement tubing. After all of the resin-forming material is in the ½" tubing a slug of salt water is added to provide a flush. During the charging of the resin-forming material into the ½" tubing string neither salt nor fresh water is added to the well. After the resin-forming material is placed in the salt-fresh water interface, the lower end of the profiling unit tubing is lowered into the salt water layer; and brine is then pumped down this tubing at the rate of 0.5 gallon per minute while fresh water is charged to the annulus between the ½" tubing and the 1½" cement tubing at the rate of 0.5 gallon per minute. By lowering and raising the profiling unit tubing, while ensuring that the bottom end of its lower tubing piece remains in the salt water level, the top of the resin-forming material layer is located at 814' while the bottom is at 815'. This determination is made immediately after the resin-forming material is placed in the interface. This particular resin-forming material is of a specific gravity of about 1.12 and is substantially non-conductive so that it could be distinguished from both the salt and fresh water layers by the use of the conductivity profiling instrument. Two minutes after the first check on the resin-forming material only about 0.1' of it could be located by the profiling unit and in less than one additional minute the material is completely displaced or moved into the adjacent formation.

Shortly after the untriggered resin-forming material is displaced into the adjacent formation, 5 additional gallons of this material, an essentially electrically, nonconductive mixture and having a specific gravity of about 1.12, is placed in the salt-fresh water interface by the procedure noted above except that the resin-forming material is flushed down the profiling unit tubing by fresh water. This composition gels in about 20 to 30 minutes. Immediately upon the placing of the resin-forming material in the interface the profiling unit detects it at a position slightly above 814½", the location of the fracture. However, as the permeability of the well at locations other than the fracture is relatively low, the resin-forming material is displaced into the adjacent area through the fracture by continuing the fresh water and brine flows at the rate of 0.5 gallon per minute. A 1000 curie cobalt[60] source is lowered to the lowermost level of and is moved upwardly through the material which is one foot in depth and receives a gamma ray dosage of one kilorep to effect polymerization of the material 3" into the formation in two to three minutes. This results in a substantial plugging of the thief zone. All of the resin-forming material is purged with nitrogen gas prior to its introduction into the well bore through the ½" tube.

It is claimed:

1. A method for decreasing the permeability of the permeable well area in a well, the steps comprising introducing into the well an aqueous resin-forming composition consisting essentially of water and from about 5% up to its limit of solubility of a mixture of (*a*) about 1 to 25 weight percent of a monomeric alkylidene bisacrylamide of the formula

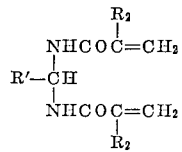

in which

is a hydrocarbon residue of an aldehyde containing from about 1 to 10 carbon atoms and $R_2$ is of the group consisting of hydrogen and methyl, and (*b*) about 75 to 99 weight percent of another ethylenic monomer copolymerizable with (*a*), conducting the composition into the permeable area and contacting the composition with a gamma radiation dosage of from about 0.05 to 150 kiloreps to set the resin-forming composition therein and decrease the permeability of the well area.

2. The method of claim 1 wherein the bisacrylamide is N,N'-methylenebisacrylamide.

3. The method of claim 2 wherein the ethylenic monomer is acrylamide and the aqueous composition contains about 0.1 to 2 weight percent of ammonium persulfate.

4. The method of claim 2 wherein the aqueous resin-forming composition contains catalytic amounts of a redox catalyst system.

5. The method of claim 4 wherein the redox catalyst system includes about 0.1 to 2.0 weight percent of an oxidizing agent and about 0.1 to 2.0 weight percent of a reducing agent.

6. The method of claim 5 wherein the oxidizing agent is ammonium persulfate, the reducing agent is nitrilotrispropionamide, and the resinous material is subjected to a gamma radiation dosage of from about 15 to 75 kiloreps.

7. A method for combatting the obstruction of gas circulation in drilling wells employing gas as the circulation medium, when the obstruction results from the ingress of extraneous materials into the well bore, the steps comprising introducing into the well bore an aqueous liquid resin-forming composition consisting essentially of water and from about 5% up to its limit of solubility of a mixture of (a) about 1 to 25 weight percent of a monomeric alkylidene bisacrylamide of the formula

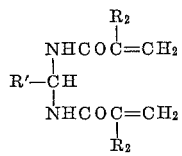

in which

is a hydrocarbon residue of an aldehyde and $R_2$ is of the group consisting of hydrogen and methyl, and (b) about 75 to 99 weight percent of another ethylenic monomer copolymerizable with (a), tracking the position of the resin-forming composition in the well bore with electrical conductivity detection means, applying pressure to the upper level of the resinous composition until said level is at the approximate depth of the top level of the formation of ingress, subjecting the resinous material in this position to a gamma radiation dosage of from about 0.05 to 150 kiloreps to solidify the resinous composition, drilling through the solidified resin, and continuing drilling with gas circulation to remove cuttings from the well.

8. A method for selectively decreasing the permeability of a well area, the steps comprising locating adjacent the well bore a permeable area to be plugged which is spaced upwardly from the bottom of the well bore, providing a salt water layer in the lower portion of the well bore to the approximate location of the permeable area, positioning on said salt water layer an aqueous liquid organic resin-forming composition consisting essentially of water and from about 5 percent up to its limit of solubility of a mixture of (a) about 1 to 25 weight percent of a monomeric alkylidene bisacrylamide of the formula

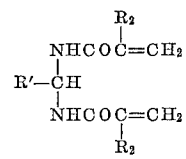

in which

is a hydrocarbon residue of an aldehyde and $R_2$ is of the group consisting of hydrogen and methyl, and (b) about 75 to 99 weight percent of another ethylenic monomer copolymerizable with (a), said composition having a vicosity of up to about 15 centipoises, moving the resin-forming composition into the adjacent permable area while the viscosity is up to about 15 centipoises, and subjecting the resin-forming composition to a gamma radiation dosage of from about 0.05 to 150 kiloreps to solidify the resinous composition and decrease the permeability of the area.

References Cited in the file of this patent

UNITED STATES PATENTS

| | | |
|---|---|---|
| 2,171,840 | Armentrout et al. | Sept. 5, 1939 |
| 2,708,973 | Twining | May 24, 1955 |
| 2,801,984 | Morgan et al. | Aug. 6, 1957 |
| 2,801,985 | Roth | Aug. 6, 1957 |
| 2,820,777 | Suen et al. | Jan. 21, 1958 |
| 2,900,027 | Cooper | Aug. 18, 1959 |
| 2,940,729 | Rakowitz | June 14, 1960 |
| 2,963,412 | Polly | Dec. 6, 1960 |
| 2,965,553 | Dixon et al. | Dec. 20, 1960 |

UNITED STATES PATENT OFFICE
CERTIFICATE OF CORRECTION

Patent No. 3,114,419                          December 17, 1963

Robert O. Perry et al.

It is hereby certified that error appears in the above numbered patent requiring correction and that the said Letters Patent should read as corrected below.

Column 2, lines 33 to 38, for that portion of the formula reading:

column 5, line 23, for "empolyed" read -- employed --; line 43, strike out "and"; column 9, line 2, for "fo" read -- of --; line 70, for "exists" read -- exits --; column 11, lines 74 and 75, for "matering" read -- material --; column 12, line 33, for "814½"" read -- 814½' --.

Signed and sealed this 16th day of June 1964.

(SEAL)
Attest:

ERNEST W. SWIDER                              EDWARD J. BRENNER
Attesting Officer                             Commissioner of Patents